US012030716B2

(12) United States Patent
Clarke et al.

(10) Patent No.: US 12,030,716 B2
(45) Date of Patent: Jul. 9, 2024

(54) STORAGE SYSTEM WITH PARTITION MEANS AND METHODS

(71) Applicant: OCADO INNOVATION LIMITED, Hatfield (GB)

(72) Inventors: Paul Clarke, Hatfield (GB); Lars Sverker Ture Lindbo, Hatfield (GB); Andrew John Ingram-Tedd, Hatfield (GB)

(73) Assignee: OCADO INNOVATION LIMITED, Hatfield Herts (GB)

( * ) Notice: Subject to any disclaimer, the term of this patent is extended or adjusted under 35 U.S.C. 154(b) by 0 days.

(21) Appl. No.: 17/351,739

(22) Filed: Jun. 18, 2021

(65) Prior Publication Data

US 2021/0309459 A1 Oct. 7, 2021

Related U.S. Application Data

(63) Continuation of application No. 15/555,814, filed as application No. PCT/EP2016/005840 on Apr. 15, 2016, now Pat. No. 11,053,073.

(51) Int. Cl.
*B65G 1/04* (2006.01)
*A62C 2/24* (2006.01)
(Continued)

(52) U.S. Cl.
CPC ............ *B65G 1/0464* (2013.01); *A62C 2/247* (2013.01); *A62C 3/002* (2013.01); *A62C 35/68* (2013.01);
(Continued)

(58) Field of Classification Search
CPC ......... A62C 2/247; A62C 3/002; A62C 35/68; A62C 99/0018; A62C 99/0027;
(Continued)

(56) References Cited

U.S. PATENT DOCUMENTS 2,701,065 A 2/1955 Bertel
3,602,313 A * 8/1971 Achs .................... A62C 3/002
169/61

(Continued)

FOREIGN PATENT DOCUMENTS

DE 2719953 A1 7/1978
DE 4439740 C1 5/1996
(Continued)

OTHER PUBLICATIONS

Examination Report dated Apr. 12, 2017 in corresponding Great Britain Patent Application No. GB1606685.4, 3 pages.
(Continued)

*Primary Examiner* — Darren W Gorman
(74) *Attorney, Agent, or Firm* — BUCHANAN INGERSOLL & ROONEY PC

(57) ABSTRACT

A storage system is described where goods are stored in containers and the containers are stored in stacks. Above the stacks runs a grid network of tracks on which load handling devices run. The load handling devices take containers from the stacks and deposit then at alternative locations in the stacks or deposit then at stations where goods may be picked out. The framework may be provided with one or more of the following services: power, power control, heating, lighting, cooling, sensing, and data logging. A method of partitioning the storage system prevents the spread of fire or prevent damage caused by sprinkler activation.

11 Claims, 11 Drawing Sheets

(51) Int. Cl.
- *A62C 3/00* (2006.01)
- *A62C 35/68* (2006.01)
- *A62C 99/00* (2010.01)
- *E04B 1/348* (2006.01)
- *E04B 1/94* (2006.01)
- *E04B 2/74* (2006.01)
- *A01G 9/02* (2018.01)
- *A01G 9/16* (2006.01)
- *A01G 9/18* (2006.01)
- *A01G 31/06* (2006.01)
- *A47L 7/00* (2006.01)
- *B62D 33/02* (2006.01)
- *B65D 21/02* (2006.01)
- *B65G 1/06* (2006.01)
- *B65G 1/137* (2006.01)
- *B65G 57/03* (2006.01)
- *B65G 63/00* (2006.01)
- *B65G 67/02* (2006.01)
- *E04H 6/18* (2006.01)
- *E06B 9/68* (2006.01)

(52) U.S. Cl.
CPC ............ *A62C 99/0018* (2013.01); *E04B 1/94* (2013.01); *E04B 2/7403* (2013.01); *E04B 2/7409* (2013.01); *A01G 9/022* (2013.01); *A01G 9/16* (2013.01); *A01G 9/18* (2013.01); *A01G 31/06* (2013.01); *A47L 7/0047* (2013.01); *B62D 33/02* (2013.01); *B62D 33/0207* (2013.01); *B65D 21/0212* (2013.01); *B65G 1/0407* (2013.01); *B65G 1/0478* (2013.01); *B65G 1/065* (2013.01); *B65G 1/137* (2013.01); *B65G 57/03* (2013.01); *B65G 63/004* (2013.01); *B65G 67/02* (2013.01); *B65G 2207/22* (2013.01); *B65G 2207/40* (2013.01); *E04B 1/34807* (2013.01); *E04H 6/18* (2013.01); *E06B 9/68* (2013.01); *E06B 2009/6818* (2013.01); *Y02A 40/25* (2018.01); *Y02P 60/14* (2015.11); *Y02P 60/21* (2015.11); *Y10S 901/01* (2013.01)

(58) Field of Classification Search
CPC .. B65G 1/0407; B65G 1/0464; B65G 1/0478; B65G 1/065; B65G 1/137; B65G 57/03; B65G 63/004; B65G 67/02; B65G 2207/22; B65G 2207/40; E04B 1/34807; E04B 1/94; E04B 2/7403; E04B 2/7409
See application file for complete search history.

(56) References Cited

U.S. PATENT DOCUMENTS

| | | | |
|---|---|---|---|
| 3,744,193 A | 7/1973 | Lau et al. | |
| 4,088,232 A | 5/1978 | Lilly et al. | |
| 4,178,994 A * | 12/1979 | Ito | A62C 3/002 169/61 |
| 4,319,662 A * | 3/1982 | Liston | A62C 3/002 477/3 |
| 4,561,554 A | 12/1985 | Swincicki et al. | |
| 4,599,829 A | 7/1986 | DiMartino | |
| 4,723,381 A | 2/1988 | Straumsnes et al. | |
| 4,917,429 A | 4/1990 | Giger | |
| 4,973,219 A | 11/1990 | Brickner et al. | |
| 5,174,707 A * | 12/1992 | Suekane | A62C 3/00 52/646 |
| 6,152,287 A | 11/2000 | Luria | |
| 6,654,662 B1 | 11/2003 | Hognaland | |
| 7,565,773 B1 * | 7/2009 | Romig | E04H 5/02 588/259 |
| 8,408,863 B1 | 4/2013 | Benedict et al. | |
| 8,628,289 B1 | 1/2014 | Benedict et al. | |
| 8,807,234 B2 * | 8/2014 | Ariizumi | B66F 9/07 169/37 |
| 9,151,770 B2 | 10/2015 | Reuteler | |
| 9,422,108 B2 | 8/2016 | Hognaland | |
| 9,682,822 B2 | 6/2017 | Brett et al. | |
| 9,796,080 B2 | 10/2017 | Ingram-Tedd et al. | |
| 9,845,208 B2 | 12/2017 | Lindbo | |
| 10,000,337 B2 | 6/2018 | Lindbo et al. | |
| 2002/0057956 A1 | 5/2002 | Jephcott et al. | |
| 2003/0005626 A1 | 1/2003 | Yoneda et al. | |
| 2003/0141973 A1 | 7/2003 | Yeh et al. | |
| 2003/0156501 A1 | 8/2003 | Spindel et al. | |
| 2004/0016624 A1 | 1/2004 | Jephcott et al. | |
| 2005/0220573 A1 | 10/2005 | Benedict et al. | |
| 2006/0201377 A1 | 9/2006 | Gielow et al. | |
| 2007/0016328 A1 | 1/2007 | Ziegler et al. | |
| 2008/0075566 A1 | 3/2008 | Benedict et al. | |
| 2008/0075568 A1 | 3/2008 | Benedict et al. | |
| 2008/0075569 A1 | 3/2008 | Benedict et al. | |
| 2008/0134458 A1 | 6/2008 | Ziegler et al. | |
| 2008/0140255 A1 | 6/2008 | Ziegler et al. | |
| 2008/0155768 A1 | 7/2008 | Ziegler et al. | |
| 2008/0213073 A1 | 9/2008 | Benedict et al. | |
| 2010/0275512 A1 | 11/2010 | Nien et al. | |
| 2011/0017476 A1 * | 1/2011 | Fuchs | A62C 31/05 169/11 |
| 2011/0027059 A1 | 2/2011 | Benedict et al. | |
| 2011/0192082 A1 | 8/2011 | Uchiyama et al. | |
| 2011/0234058 A1 * | 9/2011 | Lee | G21F 7/00 312/31.1 |
| 2011/0271469 A1 | 11/2011 | Ziegler et al. | |
| 2012/0036659 A1 | 2/2012 | Ziegler et al. | |
| 2012/0147558 A1 | 6/2012 | Dunn et al. | |
| 2012/0272500 A1 | 11/2012 | Reuteler et al. | |
| 2013/0011226 A1 | 1/2013 | Camenisch et al. | |
| 2013/0270063 A1 * | 10/2013 | Yoshinaga | A62C 37/36 198/358 |
| 2014/0026474 A1 | 1/2014 | Kulas et al. | |
| 2014/0069007 A1 | 3/2014 | Chen et al. | |
| 2014/0191633 A1 | 7/2014 | Zhu et al. | |
| 2014/0238705 A1 * | 8/2014 | Gardner | A62C 3/16 169/56 |
| 2014/0283452 A1 | 9/2014 | Dittman et al. | |
| 2014/0289992 A1 | 10/2014 | Ziegler et al. | |
| 2015/0045944 A1 | 2/2015 | Visser et al. | |
| 2015/0127143 A1 | 5/2015 | Lindbo et al. | |
| 2016/0095309 A1 | 4/2016 | Beat | |
| 2016/0129587 A1 | 5/2016 | Lindbo et al. | |
| 2016/0140488 A1 | 5/2016 | Lindbo | |
| 2018/0148259 A1 | 5/2018 | Gravelle et al. | |

FOREIGN PATENT DOCUMENTS

| | | |
|---|---|---|
| DE | 102011103443 A1 | 12/2012 |
| DE | 102012025154 A1 | 6/2014 |
| EP | 0767113 B1 | 7/2002 |
| EP | 1037828 B1 | 9/2003 |
| EP | 2133289 A1 | 12/2009 |
| EP | 2308283 A1 | 4/2011 |
| EP | 2783913 A2 | 10/2014 |
| EP | 2829210 A2 | 1/2015 |
| GB | 1157145 A | 7/1969 |
| GB | 2514930 A | 12/2014 |
| GB | 2518259 A | 3/2015 |
| GB | 2520104 A | 5/2015 |
| GB | 2527543 A | 12/2015 |
| GB | 2528573 A | 1/2016 |
| GB | 2529029 A | 2/2016 |
| GB | 2529527 A | 2/2016 |
| JP | H08119408 A | 5/1996 |
| JP | H09226908 A | 9/1997 |
| JP | 09299496 A | 11/1997 |
| JP | 2000255786 A | 9/2000 |
| LU | 88754 A1 | 10/1996 |
| NO | 317366 B1 | 10/2004 |
| WO | 9204713 A1 | 3/1992 |

(56) References Cited

FOREIGN PATENT DOCUMENTS

| WO | 9738928 | A1 | 10/1997 |
|---|---|---|---|
| WO | 9849075 | A1 | 11/1998 |
| WO | 03031285 | A1 | 4/2003 |
| WO | 03095339 | A1 | 11/2003 |
| WO | 2004096609 | A1 | 11/2004 |
| WO | 2008108845 | A3 | 11/2008 |
| WO | 2011047710 | A1 | 4/2011 |
| WO | 2013082601 | A1 | 6/2013 |
| WO | 2013147597 | A1 | 10/2013 |
| WO | 2013162192 | A1 | 10/2013 |
| WO | 2013167907 | A1 | 11/2013 |
| WO | 2013169110 | A1 | 11/2013 |
| WO | 2014090684 | A1 | 6/2014 |
| WO | 2014195901 | A1 | 12/2014 |
| WO | 2014203126 | A1 | 12/2014 |
| WO | 2015019055 | A1 | 2/2015 |
| WO | 2015105426 | A1 | 7/2015 |

OTHER PUBLICATIONS

International Search Report (PCT/ISA/210) dated Jul. 15, 2016, by the European Patent Office as the International Searching Authority for International Application No. PCT/EP2016/058467.
Written Opinion (PCT/ISA/237) dated Jul. 15, 2016, by the Japanese Patent Office as the International Searching Authority for International Application No. PCT/EP2016/058467.
International Search Report (PCT/ISA/210) dated Jul. 20, 2016, by the European Patent Office as the International Searching Authority for International Application No. PCT/EP2016/058466.
Written Opinion (PCT/ISA/237) dated Jul. 20, 2016, by the Japanese Patent Office as the International Searching Authority for International Application No. PCT/EP2016/058466.
International Search Report (PCT/ISA/210) dated Jul. 18, 2016, by the European Patent Office as the International Searching Authority for International Application No. PCT/EP2016/058405.
Written Opinion (PCT/ISA/237) dated Jul. 18, 2016, by the Japanese Patent Office as the International Searching Authority for International Application No. PCT/EP2016/058405.
International Search Report (PCT/ISA/210) dated Jul. 14, 2016, by the European Patent Office as the International Searching Authority for International Application No. PCT/EP2016/058385.
Written Opinion (PCT/ISA/237) dated Jul. 14, 2016, by the Japanese Patent Office as the International Searching Authority for International Application No. PCT/EP2016/058385.
International Search Report (PCT/ISA/210) dated Jul. 19, 2016, by the European Patent Office as the International Searching Authority for International Application No. PCT/EP2016/058384.
Written Opinion (PCT/ISA/237) dated Jul. 19, 2016, by the Japanese Patent Office as the International Searching Authority for International Application No. PCT/EP2016/058384.
International Search Report (PCT/ISA/210) dated Jul. 18, 2016, by the European Patent Office as the International Searching Authority for International Application No. PCT/EP2016/058381.
Written Opinion (PCT/ISA/237) dated Jul. 18, 2016, by the Japanese Patent Office as the International Searching Authority for International Application No. PCT/EP2016/058381.
International Search Report (PCT/ISA/210) dated Aug. 30, 2016, by the European Patent Office as the International Searching Authority for International Application No. PCT/EP2016/058366.
Written Opinion (PCT/ISA/237) dated Aug. 30, 2016, by the Japanese Patent Office as the International Searching Authority for International Application No. PCT/EP2016/058366.
International Search Report (PCT/ISA/210) dated Jul. 14, 2016, by the European Patent Office as the International Searching Authority for International Application No. PCT/EP2016/058407.
Written Opinion (PCT/ISA/237) dated Jul. 14, 2016, by the Japanese Patent Office as the International Searching Authority for International Application No. PCT/EP2016/058407.
Search Report dated Dec. 22, 2016, by the European Patent Office for Application No. 1606679.7.
Search Report dated Dec. 21, 2016, by the European Patent Office for Application No. 1606677.1.
Search Report dated Mar. 8, 2016, by the European Patent Office for Application No. 1518089.6.
Office Action (Communication) dated May 13, 2022, by the European Patent Office in corresponding European Patent Application No. 16 720 059.1. (7 pages).

\* cited by examiner

STORAGE SYSTEM WITH PARTITION MEANS AND METHODS

CROSS-REFERENCE TO RELATED APPLICATIONS

This application claims priority from UK Patent Application Nos. GB1506365.4 filed 15 Apr. 2015, GB1514428.0 filed 13 Aug. 2015, GB1518089.6 filed 13 Oct. 2015, GB1602332.7 filed 9 Feb. 2016, GB1518091.2 filed 13 Oct. 2015, GB1518094.6 filed 13 Oct. 2015, GB1518111.8 filed 13 Oct. 2015, GB1518115.9 filed 13 Oct. 2015, GB1518117.5 filed 13 Oct. 2015 and GB1603328.4 filed 25 Feb. 2016 the content of all these applications hereby being incorporated by reference.

TECHNICAL FIELD

The present invention relates to storage systems. More specifically but not exclusively, it relates to storage systems having storage bins in stacks, the stacks being located with a grid structure.

BACKGROUND

Some commercial and industrial activities require systems that enable the storage and retrieval of a large number of different products. One known type of system for the storage and retrieval of items in multiple product lines involves arranging storage bins or containers in stacks on top of one another, the stacks being arranged in rows. The storage bins or containers are accessed from above by load handling devices, removing the need for aisles between the rows and allowing more containers to be stored in a given space.

Methods of handling containers stacked in rows have been well known for decades. In some such systems, for example as described in U.S. Pat. No. 2,701,065, to Bertel comprise free-standing stacks of containers arranged in rows in order to reduce the storage volume associated with storing such containers but yet still providing access to a specific container if required. Access to a given container is made possible by providing relatively complicated hoisting mechanisms which can be used to stack and remove given containers from stacks. The cost of such systems are, however, impractical in many situations and they have mainly been commercialised for the storage and handling of large shipping containers.

The concept of using freestanding stacks of containers and providing a mechanism to retrieve and store specific containers has been developed further, for example as described in EP 0 767 113 B to Cimcorp. '113 discloses a mechanism for removing a plurality of stacked containers, using a robotic load handler in the form of a rectangular tube which is lowered around the stack of containers, and which is configured to be able to grip a container at any level in the stack. In this way, several containers can be lifted at once from a stack. The movable tube can be used to move several containers from the top of one stack to the top of another stack, or to move containers from a stack to an external location and vice versa. Such systems can be particularly useful where all of the containers in a single stack contain the same product (known as a single-product stack).

In the system described in '113, the height of the tube has to be as least as high as the height of the largest stack of containers, so that that the highest stack of containers can be extracted in a single operation. Accordingly, when used in an enclosed space such as a warehouse, the maximum height of the stacks is restricted by the need to accommodate the tube of the load handler.

EP 1037828 B1 (Autostore) the contents of which are incorporated herein by reference, describes a system in which stacks of containers are arranged within a frame structure. A system of this type is illustrated schematically in FIGS. 1 to 4 of the accompanying drawings. Robotic load handling devices can be controllably moved around the stack on a system of tracks on the upper most surface of the stack.

Other forms of robotic load handling device are further described in, for example, Norwegian patent number 317366, the contents of which are incorporated herein by reference. FIGS. 3(*a*) and 3(*b*) are schematic perspective views of a load handling device from the rear and front, respectively, and FIG. 3(*c*) is a schematic front perspective view of a load handling device lifting a bin.

A further development of load handling device is described in UK Patent Application No 1314313.6 (Ocado) where each robotic load handler only covers one grid space, thus allowing higher density of load handlers and thus higher throughput of a given size system. However, any suitable form of load handling device may be used.

In such storage systems, a large number of containers are packed in a dense manner over a large area. In the event of some form of disaster, such as a sprinkler deployment, a fire or a malfunction of the system it is necessary to shut down the whole storage system at great cost, causing disruption to the operation of any business utilising the system.

SUMMARY

According to the invention there is provided a storage system comprising: a first set of parallel rails or tracks and a second set of parallel rails or tracks extending transverse to the first set in a substantially horizontal plane to form a grid pattern comprising a plurality of grid spaces; a set of uprights, the uprights and tracks together defining a framework; a plurality of storage containers arranged in stacks, located beneath the rails and within the framework; at least one load handling device disposed on the grid, arranged to move laterally above the stacks on the rails, the load handling device comprising a lifting device arranged to lift one or more containers, or parts thereof, from a stack; wherein the system comprises partition means, the partition means being positioned beneath the level of the grid and acting to divide the storage system into separately sealable portions.

According to a further aspect of the invention there is provided a storage system comprising: a first set of parallel rails or tracks and a second set of parallel rails or tracks extending transverse to the first set in a substantially horizontal plane to form a grid pattern comprising a plurality of grid spaces; a set of uprights, the uprights and tracks together defining a framework; a plurality of storage containers arranged in stacks, located beneath the rails and within the framework; at least one load handling device disposed on the grid, arranged to move laterally above the stacks on the rails, the load handling device comprising a lifting device arranged to lift one or more containers, or parts thereof, from a stack; wherein the framework comprises deployable partition means, the deployable partition means being activated in response to a predetermined event, the partition means being positioned beneath the level of the grid and acting to divide the storage system into separately sealable portions.

According to the invention there is further provided a method of dividing a storage system in to separably sealable portions, the storage system comprising a framework, the framework comprising a substantially horizontal grid structure mounted on substantially vertical uprights, the system further comprising a plurality of stacked containers disposed within the framework, comprising the steps of: providing deployable partitioning means on the underside of the grid; deploying said deployable partitioning means in response to a predetermined signal; and urging the deployable partitioning means against the base of the storage system.

Advantageously, in accordance with one form of the invention, the uprights of the frame structure carry services such as power, water supply, data communications means, lighting means and sensing means throughout the frame structure.

In accordance with a further aspect of the invention, the services may be directed from the uprights to the individual bins, for example water may be sprayed on to the bins from the uprights.

In accordance with yet another aspect of the invention, the uprights may carry sensing means to detect fire, smoke, heat or gas within the frame structure.

In accordance with a further aspect of the invention, the uprights may comprise power supply cabling or data communications cabling such as fibre optics.

In accordance with a further aspect of the invention the substantially horizontal grid structure may be provided with collapsible walkways and/or guard rails in order to facilitate access to the sectioned area in the event of a partition deployment.

In accordance with a further aspect of the invention, the partitioning may create separate temperature zones within a given storage system.

In this way, in the event of a catastrophic failure in part of the storage system, the relevant part may be partitioned off from the remainder of the system such that the system remains safe yet operational.

In this way, the present invention overcomes the problems of the prior art and provides a system and method of increasing the reliability and reducing the overall cost of large bin handling storage systems.

BRIEF DESCRIPTION OF THE DRAWINGS

The invention will now be described with reference to the accompanying diagrammatic drawings in which:

FIG. 5a is a schematic perspective view of the known storage system of FIGS. 1 and 4 with the detail of the uprights and the load handling devices removed for clarity;

DETAILED DESCRIPTION

Figure 1:
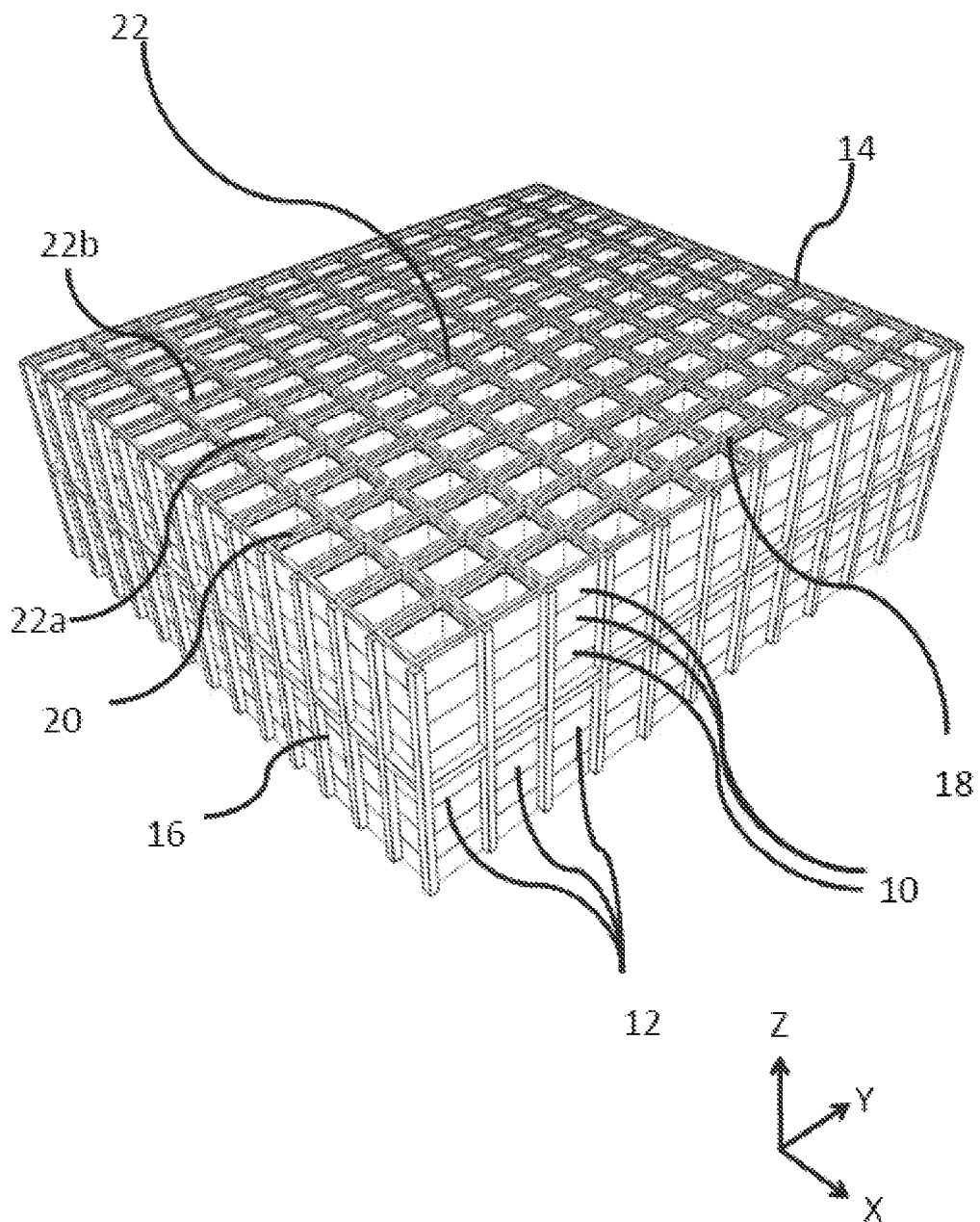
FIG. 1 is a schematic perspective view of a frame structure for housing a plurality of stacks of bins in a storage system, the system comprising a substantially horizontal grid mounted on a series of uprights, the grid and uprights together defining a framework.
Figure 2:
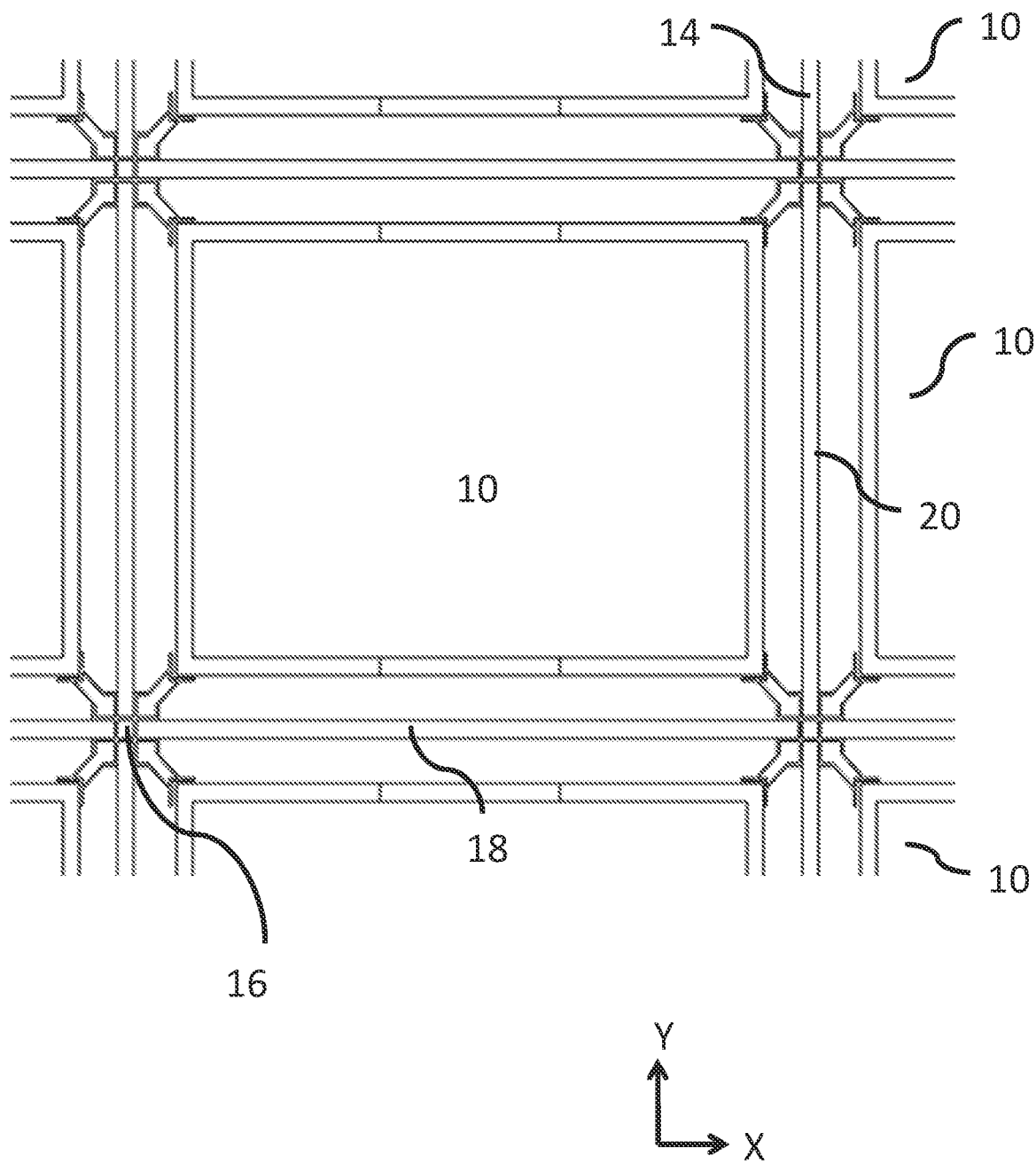
FIG. 2 is a schematic plan view of part of the grid structure of FIG. 1.

As shown in FIGS. 1 and 2, stackable containers, known as bins 10, are stacked on top of one another to form stacks 12. The stacks 12 are arranged in a frame structure 14 in a warehousing or manufacturing environment. FIG. 1 is a schematic perspective view of the frame structure 14, and FIG. 2 is a top-down view showing a single stack 12 of bins 10 arranged within the frame structure 14. Each bin 10 typically holds a plurality of product items (not shown), and the product items within a bin 10 may be identical, or may be of different product types depending on the application.

The frame structure 14 comprises a plurality of upright members 16 that support horizontal members 18, 20. A first set of parallel horizontal members 18 is arranged perpendicularly to a second set of parallel horizontal members 20 to form a substantially horizontal grid structure supported by the upright members 16. The members 16, 18, 20 are typically manufactured from metal. The bins 10 are stacked between the members 16, 18, 20 of the frame structure 14, so that the frame structure 14 guards against horizontal movement of the stacks 12 of bins 10, and guides vertical movement of the bins 10.

Figure 3A:
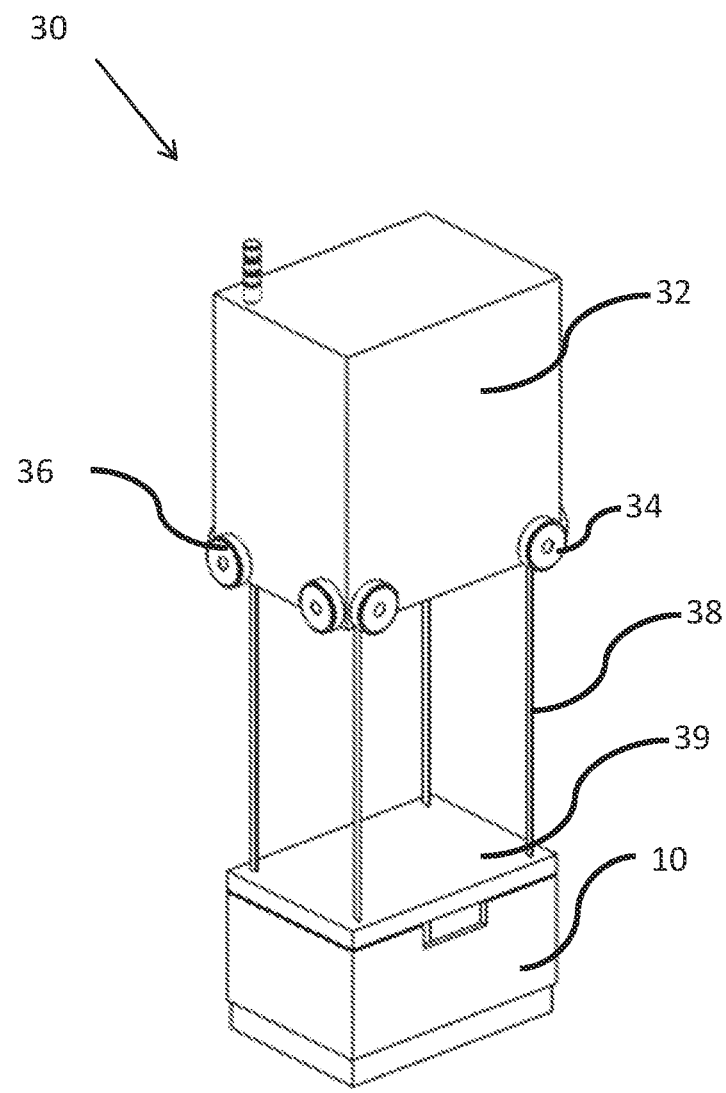
FIGS. 3(a) and 3(b) are schematic perspective views, from the rear and front respectively, of one form of robotic load handling device for use with the frame structure of FIGS. 1 and 2.
Figure 3B:
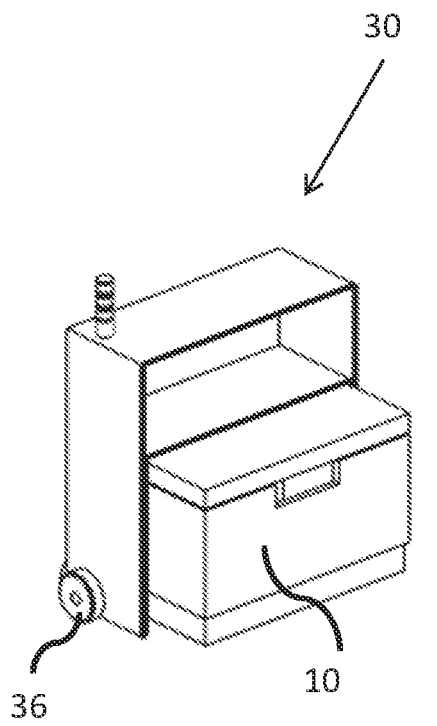
Figure 3C:
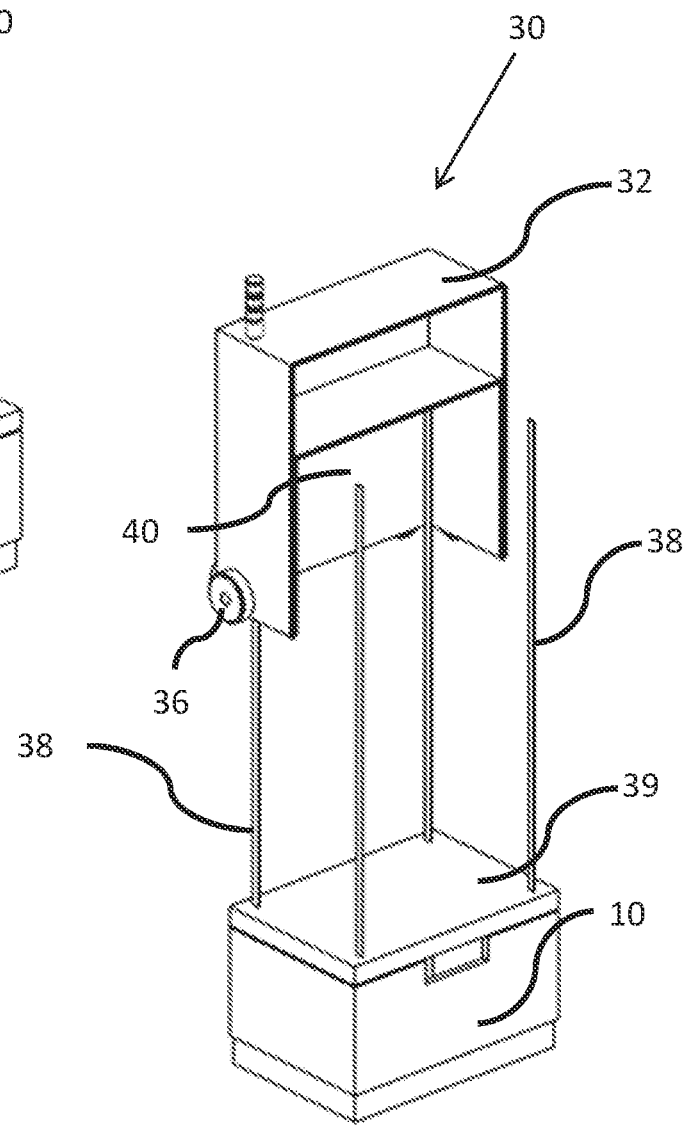
FIG. 3(c) is a schematic perspective view of the known load handler device in use lifting a bin.
Figure 4:
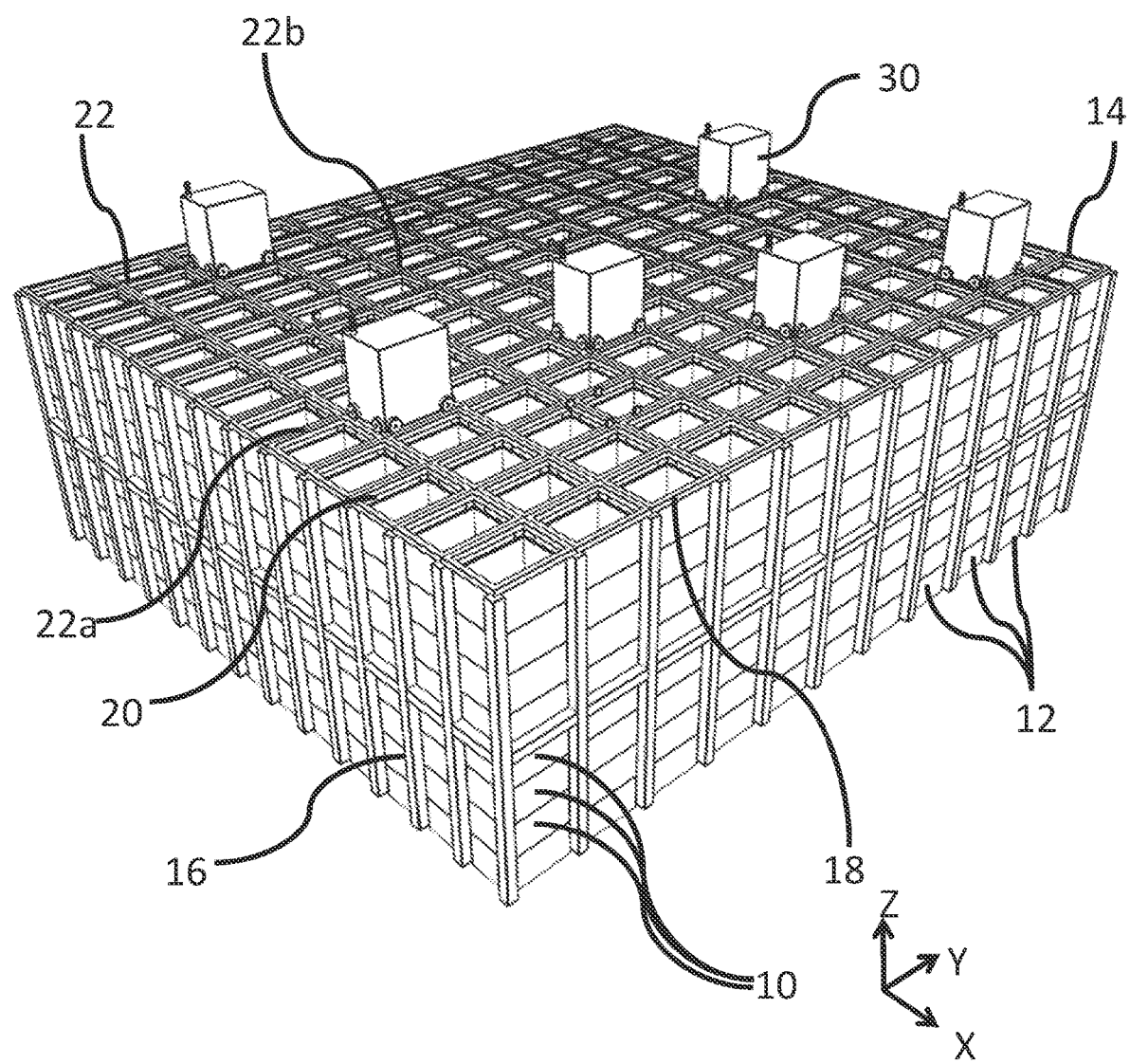
FIG. 4 is a schematic perspective view of a known storage system comprising a plurality of load handler devices of the type shown in FIGS. 3(a), 3(b) and 3(c), installed on the frame structure of FIGS. 1 and 2, together with a robotic service device in accordance with one form of the invention.

The top level of the frame structure 14 includes rails 22 arranged in a grid pattern across the top of the stacks 12. Referring additionally to FIGS. 3 and 4, the rails 22 support a plurality of robotic load handling devices 30. A first set 22a of parallel rails 22 guide movement of the load handling devices 30 in a first direction (X) across the top of the frame structure 14, and a second set 22b of parallel rails 22, arranged perpendicular to the first set 22a, guide movement of the load handling devices 30 in a second direction (Y), perpendicular to the first direction. In this way, the rails 22 allow movement of the load handling devices 30 in two dimensions in the X-Y plane, so that a load handling device 30 can be moved into position above any of the stacks 12.

Each load handling device 30 comprises a vehicle 32 which is arranged to travel in the X and Y directions on the rails 22 of the frame structure 14, above the stacks 12. A first set of wheels 34, consisting of a pair of wheels 34 on the front of the vehicle 32 and a pair of wheels 34 on the back of the vehicle 32, are arranged to engage with two adjacent rails of the first set 22a of rails 22. Similarly, a second set of wheels 36, consisting of a pair of wheels 36 on each side of the vehicle 32, are arranged to engage with two adjacent rails of the second set 22b of rails 22. Each set of wheels 34, 36 can be lifted and lowered, so that either the first set of wheels 34 or the second set of wheels 36 is engaged with the respective set of rails 22a, 22b at any one time.

When the first set of wheels 34 is engaged with the first set of rails 22a and the second set of wheels 36 are lifted clear from the rails 22, the wheels 34 can be driven, by way of a drive mechanism (not shown) housed in the vehicle 32, to move the load handling device 30 in the X direction. To move the load handling device 30 in the Y direction, the first set of wheels 34 are lifted clear of the rails 22, and the second set of wheels 36 are lowered into engagement with the second set of rails 22a. The drive mechanism can then be used to drive the second set of wheels 36 to achieve movement in the Y direction.

In this way, one or more robotic load handling devices 30 can move around the top surface of the stacks 12 on the frame structure 14 under the control of a central picking system (not shown). Each robotic load handling device 30 is provided with means 38, 39 for lifting out one or more bins or containers from the stack to access the required products. In this way, multiple products can be accessed from multiple locations in the grid and stacks at any one time.

FIG. 4 shows a typical storage system as described above, the system having a plurality of load handling devices 30 active on the stacks 12.

FIGS. 1 and 4 show the bins 10 in stacks 12 within the storage system. It will be appreciated that there may be a large number of containers 10 in any given storage system and that many different goods may be stored in the stacks, each container 10 may contain different goods within a single stack. Furthermore, it will be appreciated that the containers may be empty whilst stored in the stacks or may contain items such as parcels or other items for future delivery.

FIG. 5a shows a simplified schematic diagram of a grid structure such as the one shown in FIG. 1. The framework 14 is depicted without showing the individual uprights 16.

Figure 5B:
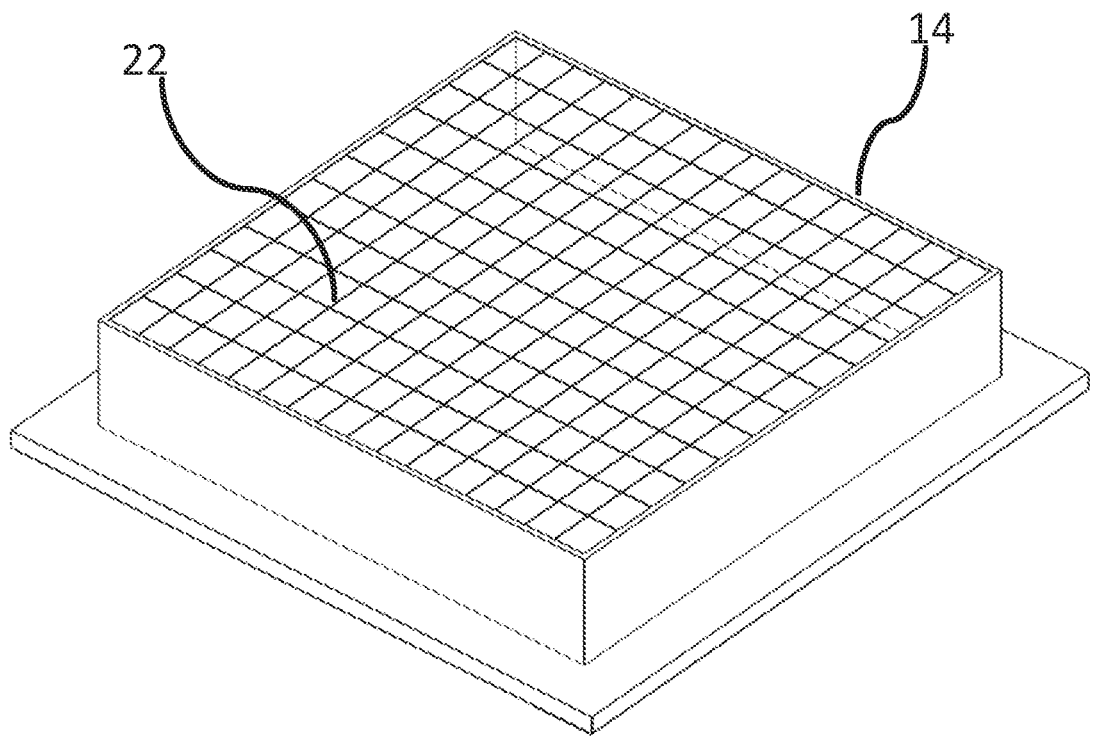
FIG. 5b is a schematic perspective view of the storage system of FIG. 1 in accordance with one aspect of the invention, the system further comprising partitions disposed beneath the grid structure, the representation of the grid structure being removed for clarity.
Figure 5B:
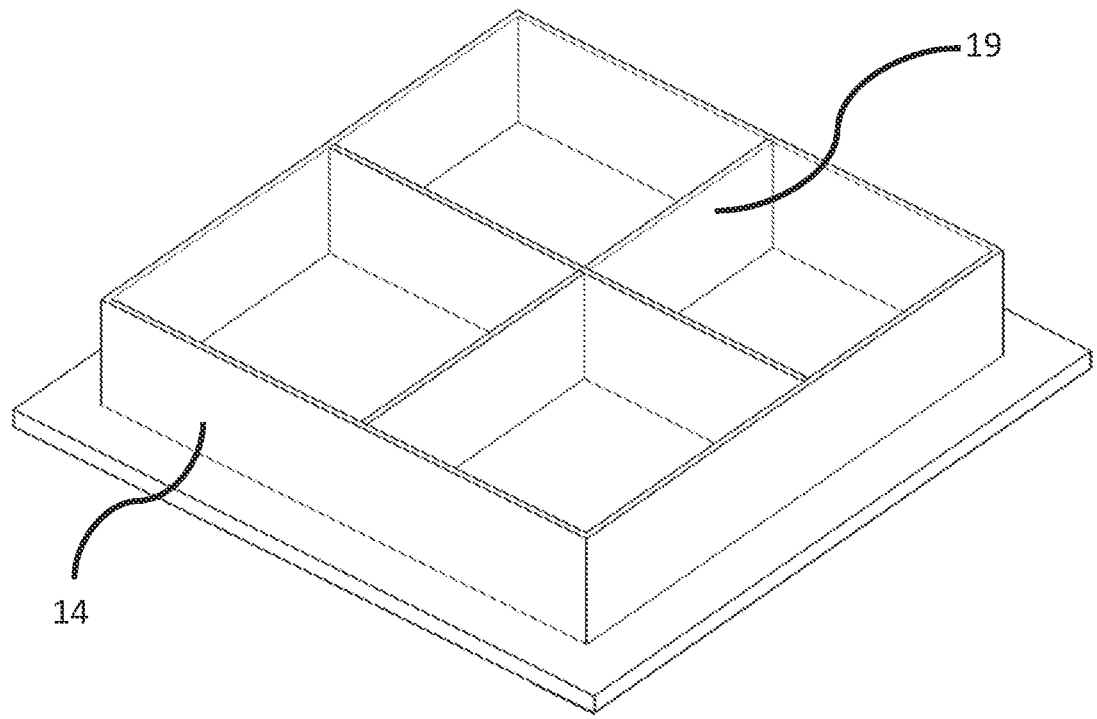

In accordance with one form of the invention, as shown in FIG. 5b the storage system may be partitioned by dividers 19. In FIG. 5b, the representation of the grid 22 has been removed to improve the clarity of the Figures. Additionally, the framework 14 has been depicted without the individual uprights 16 for clarity. It should be appreciated that the sides of the framework comprise uprights 16 as shown in FIG. 1. The dividers 19 act so as to section off the storage system. The grid may be sub-divided into smaller sections, with solid dividers 19 up to a level below the top of the grid. The dividers 19 may be formed from steel, aluminium or any other material suitable for dividing the storage system.

In use, the load handling devices 30 are operable on the top surface of the grid and act to raise and lower containers 10 from the stacks 12 of containers 10 in the storage system.

In storage systems of this type, inevitably there are items that require storage that may be ignitable or constitute a fire risk, for example matches or fireworks. In a large storage system containing numerous stacks 12 of containers 10 this may pose a significant fire risk, particularly if the containers 10 are packed in a dense fashion. Accordingly, such systems are provided with sprinkler systems which when deployed can extinguish any fire but can cause significant damage and disruption to the whole system.

In a conventional warehouse situation, sprinklers may be deployed from the roof of the warehouse. In a storage system as described herein, this may cover a large area and could be above the level of the grid. Such a sprinkler deployment could severely damage load handling devices 30 as well as causing damage across a large area of the system resulting in costly shut down and replenishment of goods. Restricting the sprinkler deployment to the area beneath the grid 22 and the load handling devices 30 may prevent costly damage.

In a first embodiment of the invention, dividers 19 are disposed within the framework structure 14. The dividers 19 comprise a solid, fixed installation extending from the floor of the storage system upwardly to a level substantially just below the level of the grid of the framework 14. In this way, the movement of the load handling devices 30 on the grid is not inhibited by the dividers 19.

Sprinkler means are positioned such that, in the event of a fire, water from the sprinkler system will only fall in the section of the storage system affected. The dividers 19 will prevent water from spreading to portions of the storage system not affected by the fire. In this way any discharged water would stay in one compartment of the storage system, where it would help in cooling and/or extinguishing the fire. Any water damage would not spread to other compartments, thereby limiting the total scope of the damage. The space around the solid dividers 9 could also be used to allow for installing pipes for a slow and controlled drainage of the water after a sprinkler release.

It will be appreciated that, In the event of a sprinkler activation, the robotic load handling devices 30 may be routed away from or around the affected area.

The presence of the dividers 19 restricts whatever material is released in the locale of the fire thereby preserving goods, objects, inventory items and anything else that may be contained within the containers 10.

Figure 6:
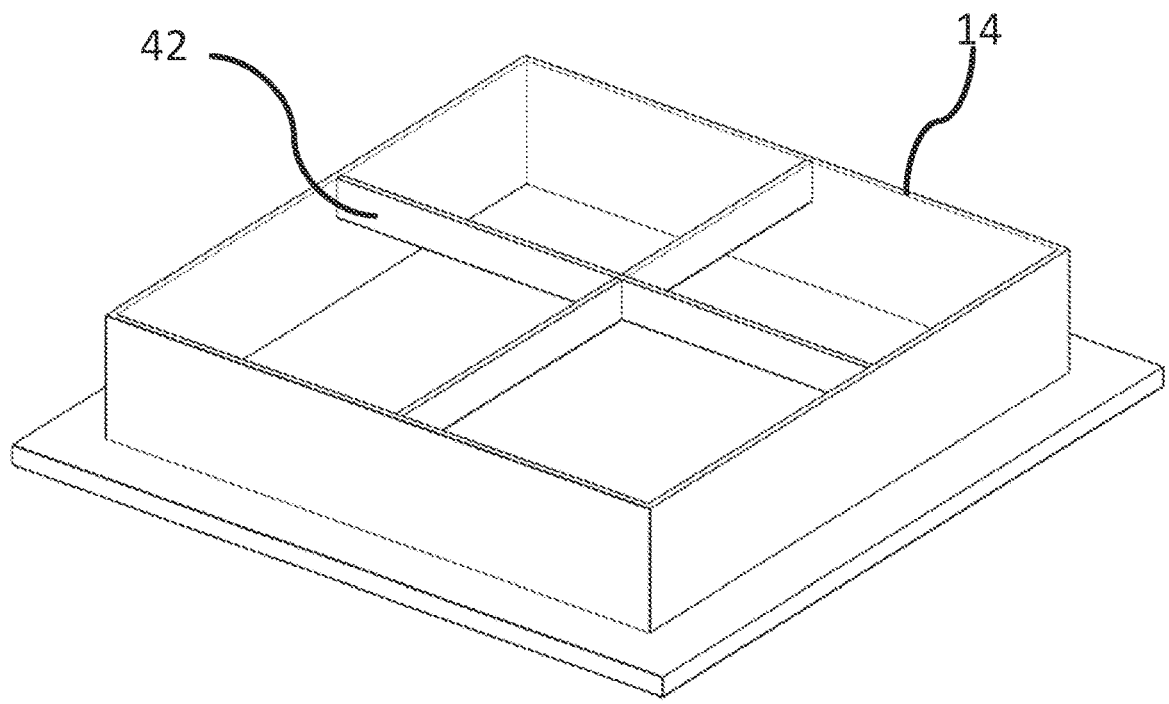
FIG. 6 is a schematic view of the storage system of FIG. 5a in accordance with one aspect of the invention showing deployable partitions, partially deployed, the partitions being mounted on the underside of the grid structure, the representation of the grid structure being removed for clarity.

As shown in FIG. 6, in a further embodiment of the invention, an alternative form of dividers are shown. The dividers 42 of the second embodiment of the invention are releasably deployable from the underside of the grid 22. The dividers 42 may comprise openable and closeable shutter systems to enable a more flexible partitioning system. The dividers 42 may be mounted on the underside of the grid 22 and be deployed only in the event of a fire being detected. Alternatively, the deployable partitions may be deployed in response to a requirement to cool or heat part of the storage system.

The partitioning means 42 may, for example, take the form of roller shutters deployable in response to a predetermined signal indicating a requirement to partition a part of the system.

Sectioning off parts of the storage system enables properties of the system to be more easily monitored and controlled.

Figure 7:
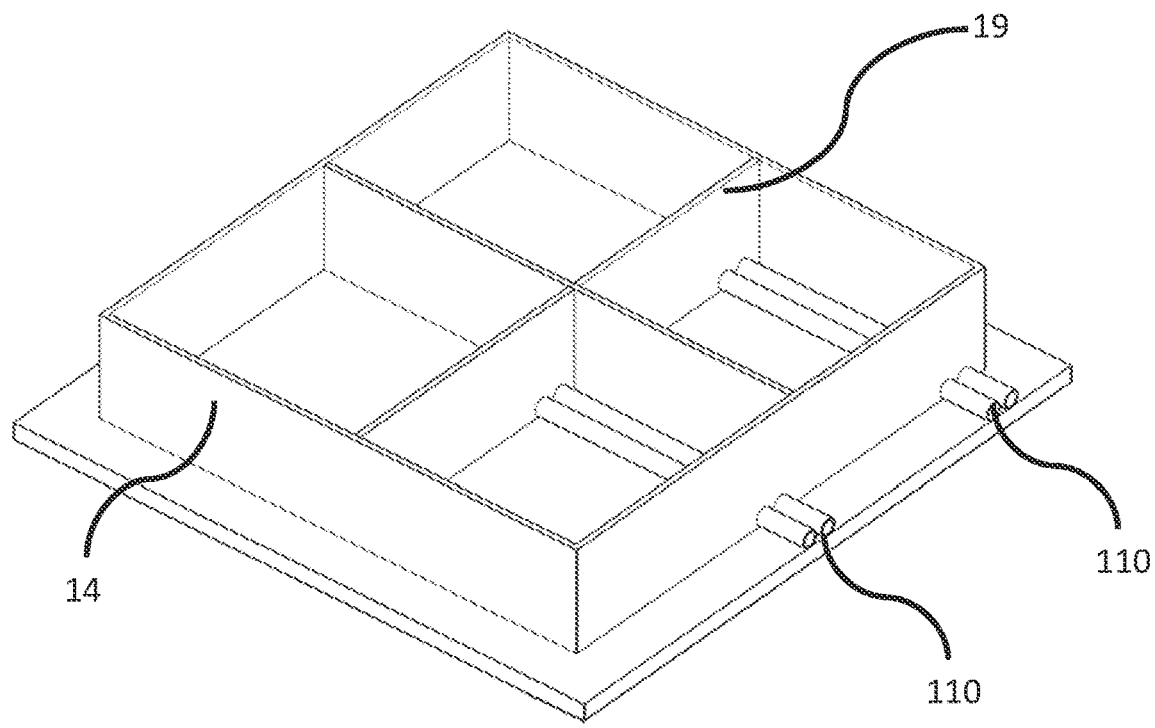
FIG. 7 is a schematic view of the storage system of FIG. 5 in accordance with one form of the invention, the structure additionally comprising drainage pipes to enable drainage of fluid in the event of a sprinkler deployment.

As shown in FIG. 7, it is possible to incorporate draining means 110 in to the various subsections of the system in order to facilitate drainage of any fluids deployed via a sprinkler activation. It will be appreciated that the drainage means may be incorporated in systems having permanent dividers 19, deployable partitions 42 or both.

Figure 8:
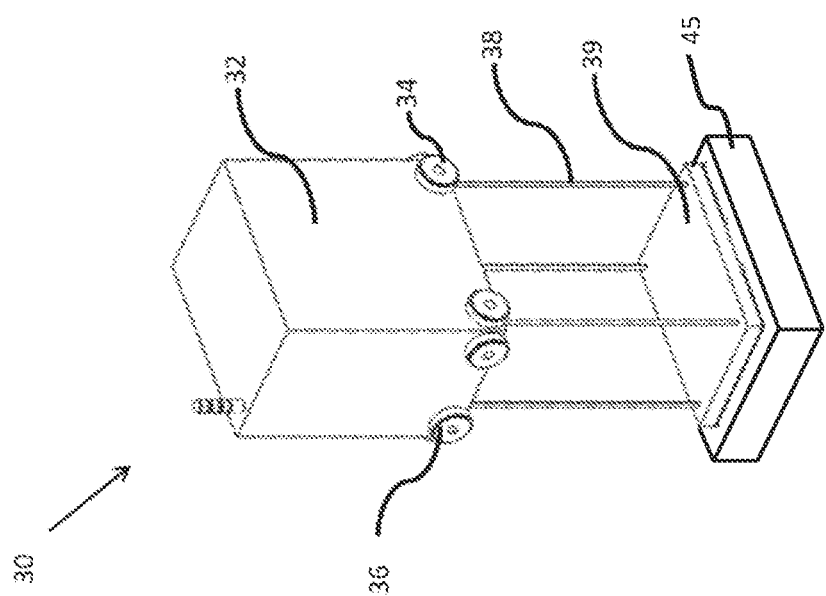
FIG. 8 is a schematic view of one form of robotic load handling device deploying a lid in accordance with one form of the invention.

It will be appreciated that including the partitioning, whether deployable or permanent, does not seal the section of the storage system from the rest of the storage system, the robotic load handling devices require access the containers in the stacks. Therefore, to completely section off a stack 12 or a number of stacks requires the grid spacing 22 at the top of the stack 12 to be sealed off. This may be achieved in a number of ways, for example, as shown in FIG. 8 a load handling device may be deployed to top the stack 12, a robotic load handling device may be deployed to fix a lid 45 on the top of the stack, or number of stacks 12, a number of robotic load handling devices may be used together to top a number of stacks 12. Alternatively, further deployable shutter means 42 may be located under the grid structure 22 to be horizontally deployed across a stack 12 or a number of stacks.

It will be appreciated that there are a number of ways both mechanically and via the robotic load handling devices 30 that this may be achieved.

It will be appreciated that the partitioning of the system may have additional advantages, for example, partitioning enables sections of the storage system to be isolated from other sections. Different portions of the system can be maintained at different temperatures. Furthermore, in the case where the system is used for such plant growing uses, there may be advantages in having different gaseous atmospheres in different portions of the system. This may be achieved by partitioning the system.

The use of the storage system described above as a greenhouse has been disclosed in UK Patent Application No GB1518094.6 to a Plant Growing System and Method filed on 13 Oct. 2015 by Ocado Innovation Limited, the contents of which is hereby incorporated by reference. For example, at different points in the growing cycle of certain crops, it may be advantageous for the crop to be exposed to different levels of $CO_2$ in the atmosphere. This may be achieved by partitioning the system.

Figure 9A:
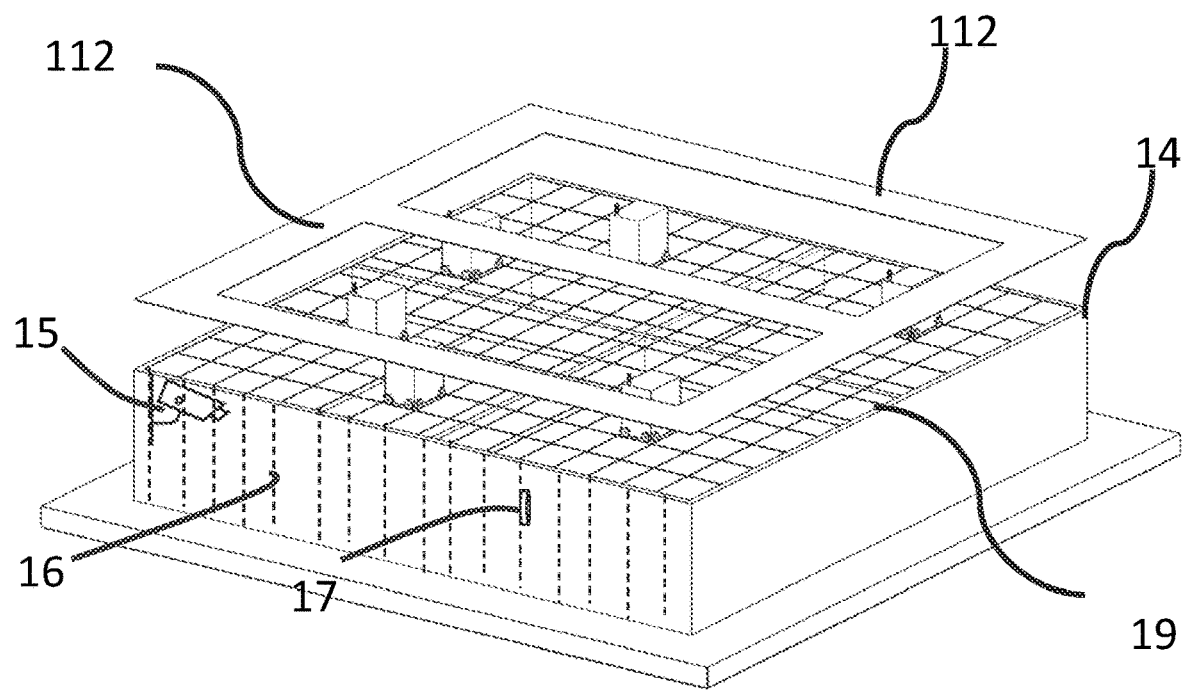
FIG. 9 is a schematic view of the storage system in accordance with a further aspect of the invention, the grid structure supporting safety barriers thereon.
Figure 9B:
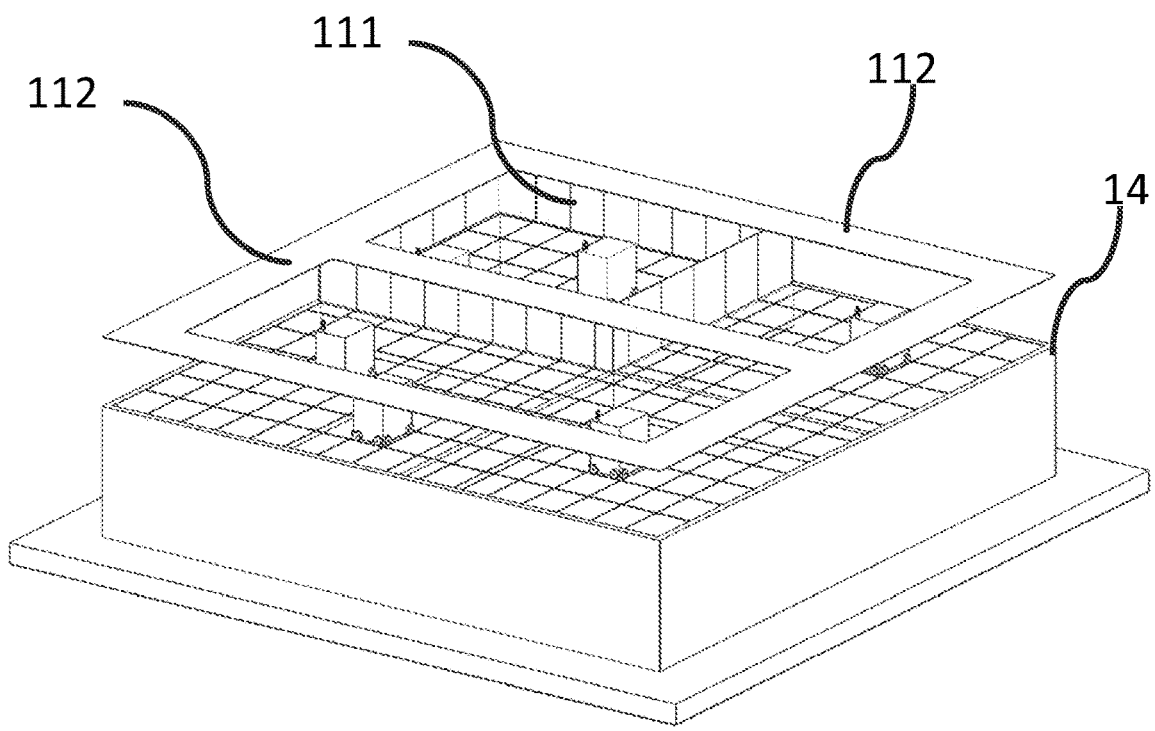

In yet another aspect of the invention, as shown in FIG. 9, the space above the divider 9 may be equipped with guard rails 111, which may be individually raised or required. In use, the guard rails 111 would be raised to prevent the load handling devices 30 from travelling from one section of the storage system to another. This is especially useful after the release of sprinklers, when a given section of the storage system may need to be dried or cleaned. It will be appreciated that it would also be useful in the case of mechanical failures of load handling devices, or other parts of the system, requiring a person to be sent onto the grid to perform repairs. Using this method, only a small part of the grid needs to be closed down during recovery.

Figure 10A:
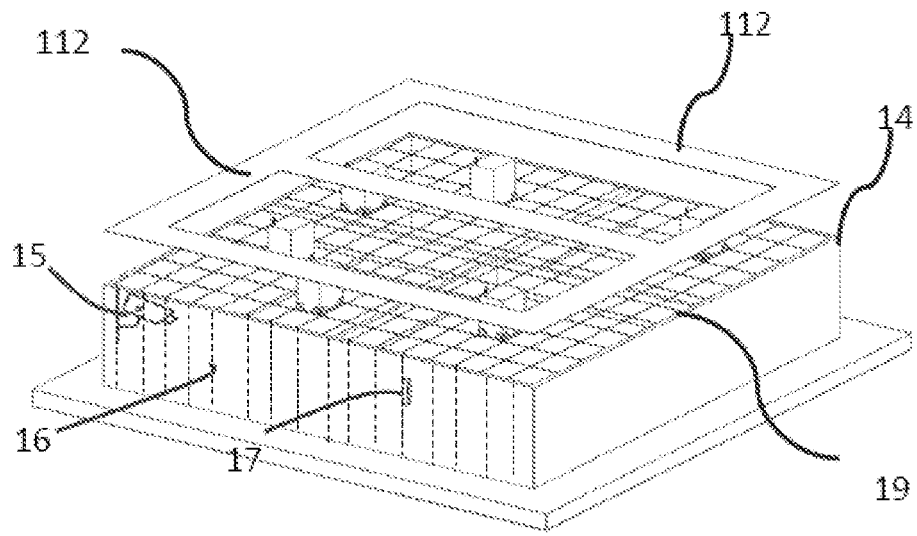
FIG. 10a is a schematic view of the storage system in accordance with a further aspect of the invention, the system comprising walkways suspended above the grid.

In further embodiment of the invention, as shown in FIG. 10a, walkways 112 could be installed above the solid dividers 19 to serve both to provide pedestrian access to all sections of the grid and to provide a structure from where the above-mentioned guard rails 112 can be lowered. The walkways 112 may also hold planks or similar which can be put on the grid 22, when it is cordoned off, to allow safe and effective pedestrian access to any malfunctioning equipment anywhere on the grid 22. It will be appreciated that the walkways may be permanently suspended from the ceiling or any structural part of the building containing the storage system.

Figure 10B:
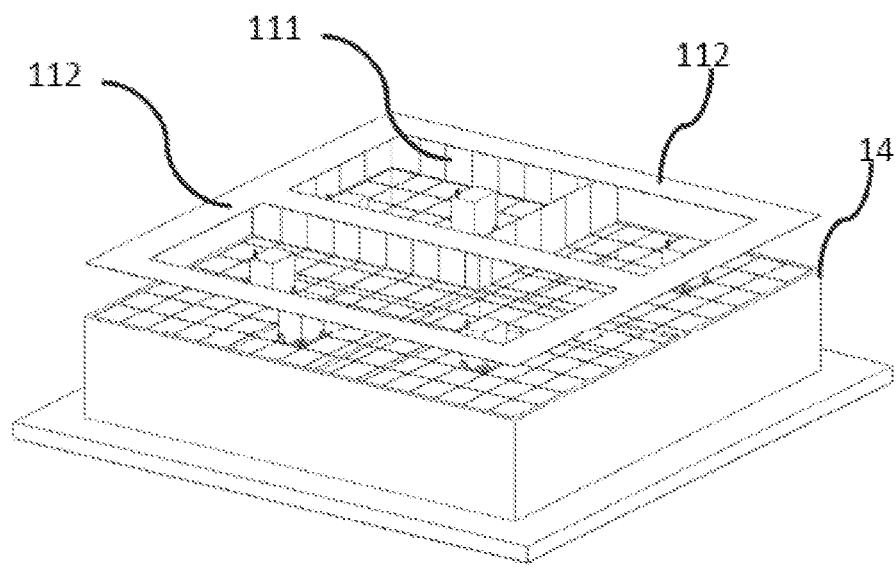
FIG. 10b is a schematic view of the frame structure of FIG. 10a in accordance with a further aspect of the invention, the walkways of FIG. 10a comprising safety barriers suspended therefrom.

FIG. 10b shows and alternative form of safety barrier 111. In this embodiment, the safety barrier 111 is deployable from the underside of the walkway 112. In this way, the substantially horizontal grid 22 is not compromised and no complicated deployment mechanism is required.

When the storage system is in use, the load handling devices 30 are operative on the grid portion 22 of the frame structure. The load handling devices move laterally above the stacks 12 of containers 10. The uprights 16 of the frame structure are supporting the load handling devices above the stacks 12. A load handling device 30, under the control of computer means, may raise a container 10 from a stack 12 and carry said container to a pick station, not shown, for an item to be removed from the container. Furthermore, load handling devices 30 act so as to place containers 10 in stacks 12 within the storage system for storage of inventory items or other items within the storage system.

It will be appreciated that the uprights 16 of the framework 14, may be provided with service means routed within the contours of the beams, around the storage system. Such services may comprise power, sensor systems, system control means or any other service that may be required within the framework of the storage system. For example, one specific example of a service supplied around the storage system is the routing of fluid supply means. The fluid supplied from the fluid supply means may be, for example, water in the manner of a sprinkler system to be deployed in the event of a fire.

UK Patent Application No GB1518115.9 to Ocado Innovation Limited, hereby incorporated by reference, details a system and method by which services and utilities may be transmitted and supplied round a framework of the nature described above.

Such services are routed around the framework via suitable cables or pipes. The cables and pipes may be mounted on the external surfaces of the uprights or on the underside of the substantially horizontal grid structure. Alternatively, the framework may be manufactured to enable routing of cables and pipework within the structure of the extrusions comprising the grid and the uprights 16.

UK Patent Application No GB1518094.6 entitled Plant Growing Systems and Methods filed on 13 Oct. 2015 by Ocado Innovation Limited, hereby incorporated by reference, details a system and method for growing plants in a storage system as described above. In particular, a fluid supply system described therein may comprise gas such as $CO_2$, as used in greenhouse applications or $N_2$ used as a fire suppressant.

Fire, smoke and temperature sensors may be disposed within the framework 14, such sensors being monitored by suitable monitoring means such that in the event of a trigger from one or more of these sensors the sprinklers may be remotely activated, to extinguish the fire or reduce the temperature.

Other sensor means that may be mounted on the framework structure may include camera means 15 such as, but not limited to, CCD cameras. Cameras 15 mounted on the uprights may be used to monitor the system whilst in use, the images being transmitted either wirelessly or via suitable communications means, to a remote monitoring system. The camera means may be used to inspect the system, for example thermal imaging may be used to detect hot spots within the system, any hot spot remotely triggering a sprinkler to be operated.

It will be appreciated that the sensors described above, and others not explicitly described, may all require power supplies, power control and means for transmitting sensor outputs to central data logging means via suitable communications means.

It will be appreciated that any type and method of communication may be used, for example WiFi, Bluetooth, 3-wire serial, SigFox or other proprietary systems such as that described in UK Patent Application No. GB1509793.4 to Ocado Innovation Limited, the contents of which in hereby incorporated by reference. It will be appreciated that any other suitable communications means or protocol may be used.

It will be appreciated that cameras may be used in conjunction with other sensors to enable remote visual inspection of the storage system should one of the other sensor systems be triggered due to a fault in the framework.

In this way, the structural and environmental condition of the storage system may be monitored continuously whilst the storage system is in use.

The uprights 16 and the framework 14 may be used to carry services that may be required by other aspects of the system. For example, power may be transmitted along suitable cables routed on the framework structure 14.

However, it will be appreciated that non contacting methods of transmitting the required power to individual containers 10 and sensors mounted on the framework 14 may be used, for example magnetic induction or RF induction. In this way, power is supplied to the service means in individual containers 10 or to sensors and sensor systems without the need for the container 10 or the sensor to be in contact with the upright 16. The uprights 16 are located adjacent the corners of the containers 10 and each upright 16 has guiderails for the corners of the container. It will be appreciated that there will be some tolerance between the guiderails and the containers 10, for example approximately 5 mm in the case of a grid for storage and retrieval of inventory items in an order fulfilment centre.

For example, certain containers 10 may contain ignitable products such as matches. In the event that the matches ignite, sensors within the framework would detect the heat, fire or smoke, and a visual inspection via a camera may identify an individual container 10. Water may be directed in to that individual container 10. In this way, a fire may be contained within a single container 10 or a few containers.

Other fire suppressant means utilise gases such as nitrogen to starve any fire of oxygen. In the event of a gas deployment, again this could be directed at individual containers 10 but may also be in the vicinity of a stack 12 or a number of stacks 12. It will be appreciated that a lack of oxygen in the atmosphere in a given area of the system may cause danger should maintenance be required by personnel. Use of gas sensors 17 within the framework 14 will establish if the environment is safe to inspect.

The uprights 16 and the underside of the grid 14 may be provided with connectors for connection of the containers 10 or the stacks 12 of containers 10 to the framework 14. For example, provision of power, data, signals and services on the framework requires connection to the containers via suitable connections, if the services are to be utilised by the containers 10. Any suitable connection means may be used that can connect to a container or to which containers 10 can releasably connect. For example telescopic umbilicals may be used that can extend to connect the containers 10 to the grid.

The uprights 16 and the framework 14 may be provided with sensing means capable of identifying individual containers 10, stacks 12 of containers or objects contained within the containers 10. Sensing means may comprise barcodes on the containers 10 and barcode readers on the uprights, alternatively camera means may be utilised. Any suitable method of labelling individual containers and reading said labels may be used to achieve the same objective.

In use, the identification and the location of given containers 10 by sensing means on the framework 14 enables the system to establish the identity, and hence contents, of individual containers adjacent to sensors, connectors and service means. In this way individual containers 10 may be controlled, monitored or treated by means provided on the framework 14 of the grid. For example said sensor and controlling means may control the temperature in individual containers 10; control the level of nutrients applied to the content of individual containers 10; communicate with the content of individual containers 10; and transmit data via the content of individual containers 10.

It will be appreciated that due to the presence of the load handling devices 30 on the grid 22 that the services provided within the framework 14 via the uprights may need to be routed from the base of the storage system.

It will be appreciated that in all aspects of the invention, the services provided on the framework 14 are not limited to those specifically described and that and service that may be routed via the uprights and the underside of the grid 22 may be installed.

It will be appreciated that depending on the services required within the storage system or provided in individual bins, aspects of the storage system may be controlled or monitored for data relating to the contents of the bins to be relayed to a central processing system. Furthermore, services and conditions within the containers or bins may be controlled, for example temperature, moisture, lighting or other parameters via control or monitoring means supplied via the uprights of the frame system. Control functions may be provided either by a local control system in the bin or by a central system sending signals to actuators in the bins via the uprights. Data transmitted may provide information on the condition of the bins, the contents of the bins or may provide information on the condition of the storage system in the vicinity of a given upright. Furthermore, in this way, the bins may be heated or cooled as required by the specific contents of the bin.

Moreover, the embodiments described above and detailed in the accompanying figures assume that the storage system comprises containers 10 in stacks 12 disposed within a framework 14 in an unfettered manner.

It will be appreciated that in accordance with an aspect of the invention, the system may be partitioned by suitable partitioning means into smaller sub sections defined by, for example temperature. In this way it would be possible to have an ambient portion, a chilled portion and a frozen portion for example. It will also be appreciated that the partitioning may have additional advantages, for example, partitioning enables sections of the storage system to be isolated from other sections. This may be necessary, as described above, if there is a fire, for example, and fire suppressant means are used in a given area to extinguish the fire. Furthermore, in the case where the system is used for alternative uses, there may be advantages in having different gaseous atmospheres in different portions of the system. This again may be achieved by partitioning the system.

It will be appreciated that the partitioning means may be temporary and remotely deployable, for example roller shutters disposed under the grid.

Figure 11:
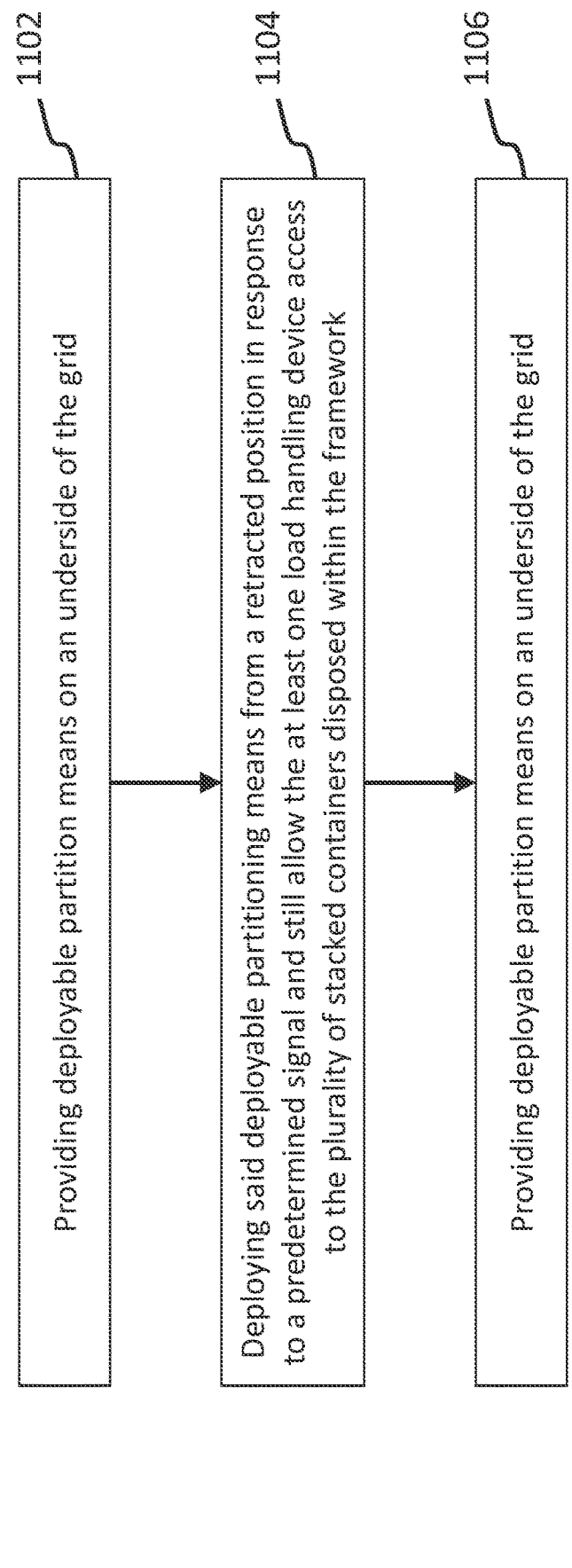
FIG. 11 is a flowchart illustrating a method of dividing a storage system in to separably sealable portions.

FIG. 11 shows a method 1100 of dividing a storage system into separably sealable portions. The framework having deployable partition means positioned adjacent the underside of the grid and acting to divide the storage system into separately sealable portions, such that the movement of each at least one load handling device operative on rails, which form the substantially horizontal grid, is unimpeded. The method includes providing the deployable partition means on an underside of the grid (step 1102) and deploying said deployable partitioning means from a retracted position in response to a predetermined signal and still allow the at least one load handling device access to the plurality of stacked containers disposed within the framework (step 1104). The method 1100 further includes urging the deployable partitioning means against a base of the storage system (step 1106).

It will be appreciated that a sprinkler system need not be limited to spraying water. The sprinkler system may spray powder or may release gas, for example N2, acting as a fire suppressant. It will be appreciated that the sprinkler system may release other gases, for example CO2.

Many variations and modifications not explicitly described above are also possible without departing from the scope of the invention as defined in the appended claims.

What is claimed is:

1. A method of containing a fire in a storage system, the storage system having: a first set of parallel rails and a second set of parallel rails extending transverse to the first set in a substantially horizontal plane to form a substantially horizontal grid having a plurality of grid spaces, a set of vertical uprights on which the substantially horizontal grid is mounted, the vertical uprights and the rails together defining a framework, the system including a plurality of stacked containers disposed within stacks in the framework, and deployable partition means positioned adjacent an underside of the grid and acting to divide the storage system into separately sealable portions of the stacks, such that the movement of at least one load handling device operative on the rails, which form the substantially horizontal grid, is unimpeded, the method comprising:
    detecting heat, fire, or smoke in an area of the framework;
    deploying the partition means in the area of the framework where the heat, fire, or smoke is detected, the partition means being deployed such that movement on the rails by the at least one load handling device is unimpeded; and
    directing water or other fire suppressant material to the detected heat, fire, or smoke.

2. The method according to claim 1, comprising:
    identifying by visual inspection, via a camera, an individual container of the stacked containers, wherein the water or other fire suppressant material is directed to the individual container.

3. The method according to claim 1, wherein the fire suppressant material is a gas.

4. The method according to claim 3, wherein the gas is Nitrogen or CO2.

5. The method according to claim 1, comprising:
    using gas sensors within the framework to establish if an environment of the framework is safe.

6. The method according to claim 1, comprising:
    using sensing means on the framework to identify individual containers of the stacked containers within the framework; and
    controlling, monitoring and treating one of the individual containers.

7. The method according to claim 1, wherein directing water or other fire suppressant material to the detected heat, fire or smoke comprises:
    directing the water or other fire suppressant material to an area beneath grid.

8. A storage system comprising:
    a first set of parallel rails and a second set of parallel rails extending transverse to the first set in a substantially horizontal plane to form a horizontal grid having a plurality of grid spaces;
    a set of vertical uprights on which the horizontal grid is mounted, the uprights and rails together defining a framework;
    a plurality of storage containers arranged in stacks, located beneath the rails and within the framework;
    deployable partition means positioned adjacent an underside of the grid and acting to divide the storage system into separately sealable portions of the stacks, such that the movement of at least one load handling device operable on the rails is unimpeded; and
    wherein the uprights and an underside of the grid include at least one sensor for detecting heat, fire, or smoke in an area of the framework beneath the grid, connectors for connection to the containers or the stacks of containers for provision of services to the containers, and fire suppressant means for directing water or other fire suppressant material when heat, fire, or smoke is detected in the area of the framework beneath the grid, and
    wherein when heat, fire, or smoke is detected by the at least one sensor, the deployable partition means is deployed in the area of the framework where the heat, fire, or smoke is detected, with the partition means being deployed such that movement on the rails by the at least one load handling device is unimpeded.

9. A storage system according to claim 8, wherein the connectors are configured to releasably connect to the containers.

10. A storage system according to claim 8, wherein the connectors includes at least one telescopic umbilical.

11. A storage system according to claim 8, wherein the services to be provided within the framework are routed from the base of the storage system.

* * * * *